United States Patent [19]

Katano

[11] Patent Number: 5,548,366

[45] Date of Patent: Aug. 20, 1996

[54] CAMERA VIEWFINDER WITH UNIFORM COMPONENT POSITIONING REGARDLESS OF ANGLE OF VIEW OF ATTACHED LENS

[75] Inventor: Yuji Katano, Kawasaki, Japan

[73] Assignee: Nikon Corporation, Tokyo, Japan

[21] Appl. No.: 505,075

[22] Filed: Jul. 21, 1995

[30] Foreign Application Priority Data

Aug. 31, 1994 [JP] Japan .................................. 6-207141

[51] Int. Cl.$^6$ .......................... G03B 13/06; G03B 13/08
[52] U.S. Cl. ........................ 354/219; 354/225; 359/819
[58] Field of Search ................................. 354/199, 200,
354/201, 219, 222, 224, 225, 155; 359/819,
217, 218

[56] References Cited

U.S. PATENT DOCUMENTS 4,526,444   7/1985   Fantone et al. ......................... 354/225
4,527,875   7/1985   Shibata ................................... 354/225
4,545,655   10/1985  Fantone et al. ......................... 354/225

Primary Examiner—A. A. Mathews

[57] ABSTRACT

A camera having components of a viewing optical system and a display optical system fixed at positions which do not require change for photographic lenses having different angles of view. The viewing optical system allows a photographer to view a subject through a photographic lens. The viewing optical system includes an eye piece and an objective lens positioned between the eye piece and the photographic lens. The display optical system includes a framework which displays information. The display optical system allows the photographer to view the information displayed on the framework through the eyepiece. The respective positions of the eye piece, the objective lens and the framework are fixed and do not require change to allow the camera to be useable with different photographic lenses having different, respectively corresponding angles of view.

18 Claims, 2 Drawing Sheets

5,548,366

CAMERA VIEWFINDER WITH UNIFORM COMPONENT POSITIONING REGARDLESS OF ANGLE OF VIEW OF ATTACHED LENS

BACKGROUND OF THE INVENTION

1. Field of the Invention

The present invention relates to a viewfinder for a camera and, more particularly, to the uniform positioning of common viewfinder components with photographic lenses of different angles of view, thereby allowing the use of a standard viewfinder housing.

2. Description of the Related Art

Conventionally, a camera viewfinder (especially for a compact camera) is configured with different components corresponding to the use of the viewfinder with different photographic lenses. For example, a specially designed framework and specially designed viewfinder lenses are required for different photographic lenses having different angles of view, or focal lengths. This difference in the selection of components for different photographic lenses requires a specially designed viewfinder for each different photographic lens. Thus, the "box" holding the viewfinder is different for each different photographic lens.

Unfortunately, the use of different frameworks and different viewfinder boxes increases manufacturing costs. Also, the use of different viewfinder boxes prevents the use of a standardized camera body for housing the viewfinder.

SUMMARY OF THE INVENTION

Accordingly, it is an object of the present invention to provide a viewfinder for a camera, especially a compact camera, which can use the same framework and viewfinder box regardless of the angle of view of the photographic lens.

It is a further object of the present invention to provide a viewfinder having various components fixed at specific positions which do not require change, regardless of the angle of view of the photographic lens.

It is also an object of the present invention to provide a viewfinder which can be housed in a standard camera body housing.

Objects of the present invention are achieved by providing an optical device having an external lens connected thereto and allowing an optical device user to view a subject through the external lens. The optical device includes a viewing optical system and a display optical system. The viewing optical system allows the user to view the subject through the external lens. The viewing optical system includes an eye piece and an objective lens positioned between the eye piece and the external lens. The display optical system includes a framework which displays information. The display optical system allows the user to view the information displayed on the framework through the eyepiece. The respective positions of the eye piece, the objective lens and the framework are fixed and do not require changing to allow the optical device to be useable with external lenses having different, respectively corresponding angles of view.

Object are also achieved by providing the optical device with a viewing optical system having an optical path extending through the external lens and the objective lens to the eye piece, and a semi-transmittance surface positioned in the optical path. The display optical system has an optical path extending from the framework, through the semi-transmittance surface to the eye piece, and includes a target lens positioned in the optical path of the display optical system between the semi-transmittance surface and the framework. The target lens allows the diopter requirement of the display optical system to be satisfied with respect to the connected external lens.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
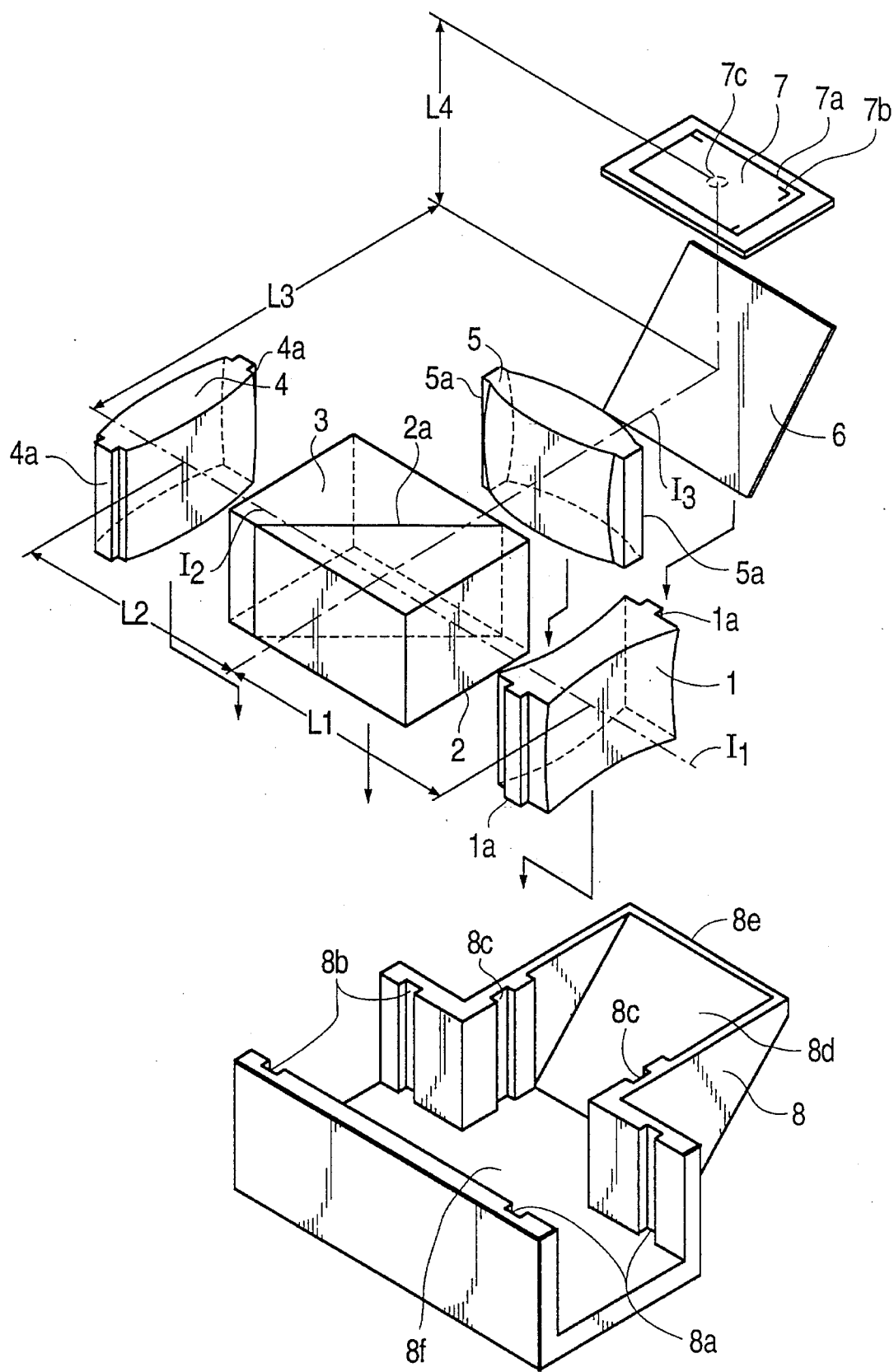
FIG. 1 is a perspective view of a viewfinder optical system for use with a photographic lens having a first focal length, according to an embodiment of the present invention.

Reference will now be made in detail to the present preferred embodiments of the present invention, examples of which are illustrated in the accompanying drawings, wherein like reference numerals refer to like elements throughout.

FIG. 1 is a perspective view of a viewfinder optical system for use with a photographic lens having a first focal length, according to an embodiment of the present invention. As will be described below, the viewfinder optical system has a viewing optical system which allows a photographer to look into an eyepiece and view a photographic subject through a photographic lens, and a display optical system which allows the photographer to look into the eyepiece and also view display information from a framework.

The viewing optical system comprises an objective lens 1, a prism 2, a prism 3, and an eye piece 4. Objective lens 1 has a negative refracting power and eyepiece 4 has a positive refracting power. Prism 2 and prism 3 are joined by a semi-transmittance surface 2a of prism 2. A photographic lens (not illustrated) is attachable to the camera so that an optical path or optical axis $I_1$ passes through the photographic lens and objective lens 1. Optical axis $I_1$ extends through eye piece 4 to define an optical path or optical axis $I_2$ of the viewing optical system. Semi-transmittance surface 2a is at a 45° angle to the optical axis $I_2$ of the viewing optical system.

The display optical system comprises a framework 7, a mirror 6, a target lens 5, semi-transmittance surface 2a, prism 3, and eye piece 4. Optical axis $I_1$ extends to framework 7 to define an optical path or optical axis $I_3$ of the display optical system. Mirror 6 changes the optical axis $I_3$ by 90°. Target lens 5 has a positive refracting power and adjusts the diopter of the framework. An illuminating window (not illustrated) is positioned on the camera body (not illustrated) to let external light into the camera interior for illuminating framework 7. Alternatively, an illuminating member, such as a lamp, can be used to illuminate framework 7.

Framework 7 has a frame 7a, a parallax frame 7b and an autofocus target mark 7c arranged thereon. Frame 7a indicates the photographic range of the camera, parallax frame 7b indicates the photographic range during close range photography and autofocus target mark 7c indicates the rangefinding area when rangefinding is performed by a rangefinding device (not illustrated). Framework 7 is preferably a liquid crystal display device (hereafter referred to as "LCD"), and configured so that frame 7a, parallax frame 7b and autofocus target mark 7c are driven by a liquid crystal drive circuit (not illustrated) so that the specified frame section is displayed. Preferably, when necessary, light from the illuminating window can pass through the liquid-crystal-driven portion of framework 7 so that the displayed information on framework 7 is observable through the display optical system.

Objective lens 1 and eye piece 4 have a distance L1+L2 therebetween, and the focal length of objective lens 1 and the focal length of eye piece 4 are determined based on the distance L1+L2 to be compatible with the angle of view of the photographic lens and to satisfy diopter requirements. Specifically, when the focal length of objective lens 1 is fo1, and the focal length of eye piece 4 is fe1, the relation L1+L2 =fo1+fe1 is satisfied, thereby satisfying the diopter of the viewing optical system.

Also, the display optical system has a distance L2+L3+L4 from framework 7 to eye piece 4. Target lens 5 is positioned to satisfy the diopter requirement of framework 7 without changing the distance L2+L3+L4. Specifically, when the focal length of eye piece 4 is fe1, and the focal length of target lens 5 is ft, the resultant focal length fe1' is obtained by the following equation.

$$\frac{1}{fe1'} = \frac{1}{fe1} + \frac{1}{ft} \qquad \text{Equation 1}$$

The focal length ft of target lens 5 is determined so that L2+L3+L4=fe1', and the diopter requirement of the display optical system is satisfied.

The respective optical components inside the viewfinder are secured to a viewfinder box 8. As illustrated by FIG. 1, objective lens 1 is supported by a respective support member 1a positioned on each side of objective lens 1. Support members 1a are inserted into support grooves 8a on viewfinder box 8 and secured. Similarly, eye piece 4 is supported by a respective support member 4a positioned on each side of eye piece 4. Support members 4a are inserted into support grooves 8b on viewfinder box 8 and secured. Target lens 5 is supported by a respective support member 5a positioned on each side of target lens 5. Support members 5a are inserted into support grooves 8c on viewfinder box 8 and secured. Prism 2 and prism 3 are joined together by semi-transmittance surface 2a and attached and secured to a bottom surface 8f of viewfinder box 8. Mirror 6 is attached and secured to a slanted surface 8d of viewfinder box 8. Framework 7 is installed on a substantially U-shaped surface 8e, and above mirror 6.

Figure 2:
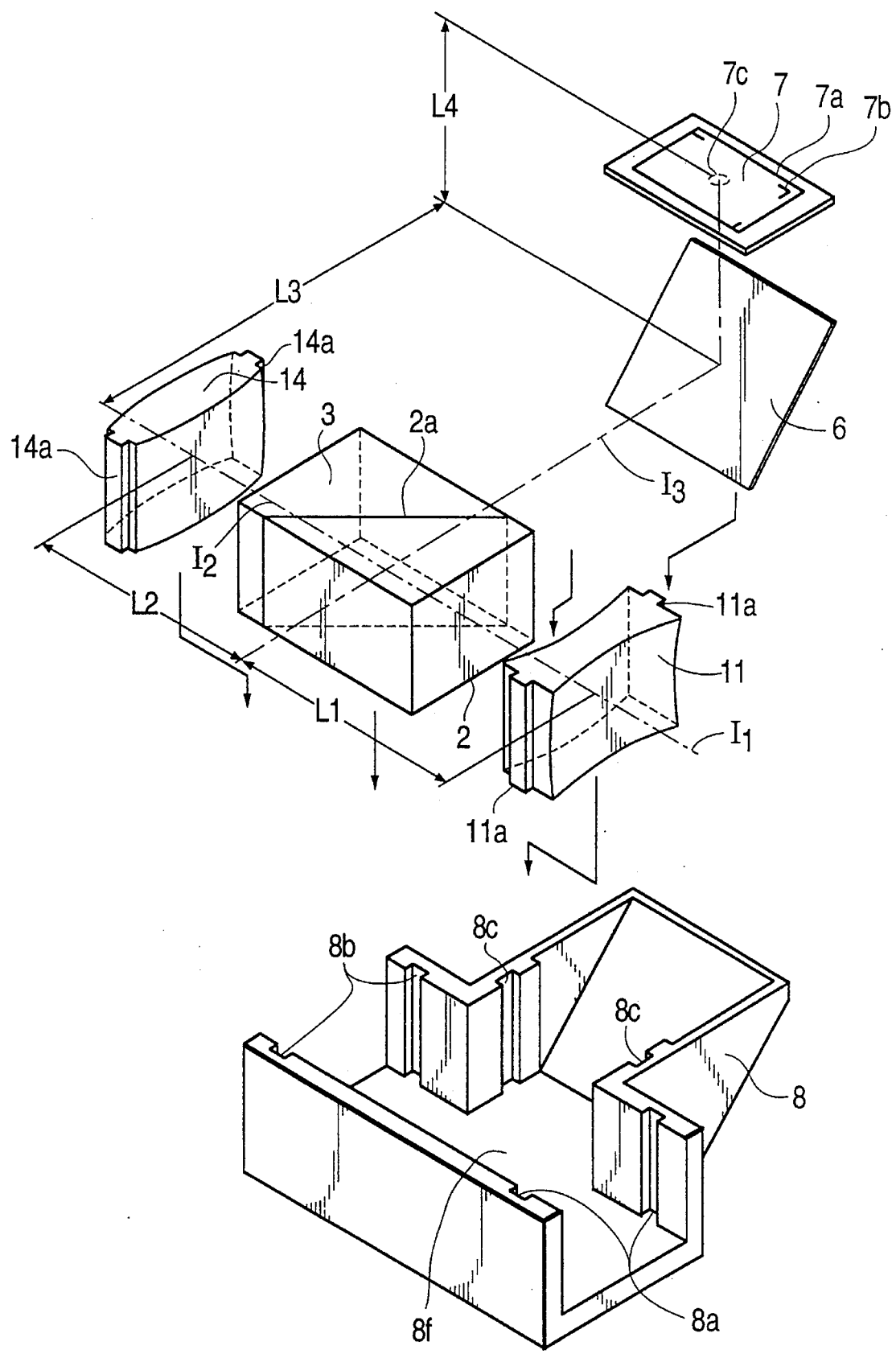
FIG. 2 is a perspective view of a viewfinder optical system for use with a photographic lens having a second focal length, according to an embodiment of the present invention, wherein the second focal length is shorter than the first focal length of the photographic lens for use with the viewfinder optical system in FIG. 1, and the angle of view of the viewfinder optical system in FIG. 2 is wider than the angle of view of the viewfinder optical system in FIG. 1.

FIG. 2 is a perspective view of a viewfinder optical system for use with a photographic lens having a second focal length, according to an embodiment of the present invention, wherein the second focal length is shorter than the first focal length of the photographic lens for use with the viewfinder optical system in FIG. 1, and the angle of view of the viewfinder optical system in FIG. 2 is wider than the angle of view of the viewfinder optical system in FIG. 1. In the viewfinder optical system in FIG. 2, a viewing optical system comprises an objective lens 11, prism 2, prism 3 and eye piece 14. Objective lens 11 has a negative refracting power and eye piece 14 has a positive refracting power. Prism 2 and prism 3 are the same as in FIG. 1. In FIG. 2, the display optical system comprises framework 7, a mirror 6, semi-transmittance surface 2a, prism 3, and eyepiece 14.

In the viewing optical system of the viewfinder optical system illustrated in FIG. 2 and similar to the viewfinder optical system illustrated in FIG. 1, objective lens 11 and eyepiece 14 have a distance L1+L2. The focal length of objective lens 11 and the focal length of eye piece 14 are determined based on the distance L1+L2 to handle the angle of view of a photographic lens (not illustrated) and the diopter requirements. As previously discussed, the angle of view of the viewfinder optical system in FIG. 2 is wider than the angle of view of the viewfinder optical system in FIG. 1. Specifically, when the focal length of objective lens 11 is fo2, and the focal length of eye piece 14 is fe2, the positioning of objective lens 11 and eye piece 14 is such that the relation L1+L2 =fo2+fe2 is satisfied, and the diopter requirement of the viewing optical system is thereby satisfied.

In the same manner as with the viewfinder optical system illustrated in FIG. 1, framework 7 of the display optical system and eye piece 14 are arranged with a distance L2+L3+L4 therebetween. The arrangement is such that the diopter requirement of framework 7 is satisfied at the distance L2+L3+L4. Specifically, L2+L3+L4=fe2 is satisfied with respect to the focal length fe2 of eye piece 14, and the diopter of the display optical system is thereby satisfied.

Because the viewfinder optical system in FIG. 2 has a wider angle of view than the viewfinder optical system in FIG. 1, the negative focal length fo2 of objective lens 11 is smaller than the focal length fo1 of objective lens 1 and, as a result, the focal length fe2 of eye piece 14 is larger than the focal length fe1 of eye piece 4. That is, |fo1|>|fo2|. Therefore, even if target lens 5 is not used in the viewfinder optical system in FIG. 2, the diopter requirement of the display optical system can be satisfied.

The respective optical components of the viewfinder optical system in FIG. 2 are secured to viewfinder box 8 in the same way as described for the viewfinder optical system in FIG. 1. As illustrated by FIG. 2, objective lens 11 is supported by a respective support member 11a positioned on each side of objective lens 11. Support members 11a are inserted into support grooves 8a on viewfinder box 8 and secured. Similarly, eye piece 14 is supported by a respective support member 14a positioned on each side of eye piece 14. Support members 14a are inserted into support grooves 8b on viewfinder box 8 and secured. Prism 2 and prism 3 are attached and secured to bottom surface 8f of viewfinder box 8. In order for support grooves 8a and 8b of viewfinder box 8 to be commonly used with a configuration as in FIG. 1, the size of objective lens support 1a of the viewfinder optical system in FIG. 1 and the size of objective lens support 11a of the viewfinder optical system in FIG. 2 are made uniform. Eye piece support 14a is also the same size as eye piece support 4a. There is no target lens in the viewfinder optical system in FIG. 2, so there is no member which fits into support grooves 8c.

According to embodiments of the present invention, a liquid crystal display device can be used as framework 7, but framework 7 may also be formed by printing on a transparent plate and removing the frame. Semi-transmittance surface 2a may also be formed by a half-mirror.

According to embodiments of the present invention, the diopter requirement of the display optical system is satisfied by attaching a target lens to, and removing it from, the display optical system in accordance with the angle of view of a photographic lens attached to the camera. Therefore, it is possible to configure a viewfinder which can handle different photographic lenses with different respective focal lengths and different respective angles, and still use the same framework. As a result, components can be standardized and costs can be reduced.

Also, in a compact camera which has photographic lenses with different focal lengths and different angles of view, a uniform space can be configured for the viewing optical system and the display optical system, so that the viewfinder box which holds the respective optical components can be standardized and costs can be reduced. Moreover, the viewfinder space inside the camera body can also be made uniform, so there are benefits in that the viewfinder attachment position and other related components can also be standardized. As a result, space can be efficiently utilized.

The configuration of a viewfinder optical system, according to the preferred embodiments of the present invention, is such that target lens 5 having a specified refracting power with respect to photographic lenses with different angles of view is positioned between semi-transmittance surface 2a and framework 7 so that the diopter requirement of the viewing optical system and the diopter requirement of the display optical system can handle photographic lenses with different angles of view. As a result, a standard framework can be used. Also, the viewing optical system and the display optical system have uniform arrangements so that a standard viewfinder box can be used.

According to embodiments of the present invention, a viewing optical system comprises an objective lens having a negative refracting power, and an eye piece having a positive refracting power. A display optical system comprises a framework and a semi-transmittance surface arranged at an angle to the optical axis of the objective lens and the eye piece. A target lens has a specified refracting power with respect to photographic lenses with different angles of view and is arranged in the optical path between the semi-transmittance surface and the framework. The distance from the objective lens to the eye piece, and the distance from the eye piece to the framework, are kept fixed. Moreover, a standard framework and viewfinder box can be used, regardless of the angle of view of the photographic lens.

According to above embodiments of the present invention, a camera has a photographic lens connected thereto and allows a photographer to view a subject through the photographic lens. The camera comprises a viewing optical system and a display optical system. The viewing optical system allows the photographer to view the subject through the photographic lens, and includes an eye piece and an objective lens positioned between the eye piece and the photographic lens. The display optical system includes a framework which displays information. The display optical system allows the photographer to view the information displayed on the framework through the eyepiece. The respective positions of the eye piece, the objective lens and the framework are fixed and do not require changing to allow the camera to be useable with different photographic lenses having different, respectively corresponding angles of view.

Moreover, according to above embodiments of the present invention, the viewing optical system has an optical path extending through the photographic lens and the objective lens to the eye piece, and includes a semi-transmittance surface positioned in the optical path. The display optical system has an optical path extending from the framework, through the semi-transmittance surface to the eye piece, and includes a target lens positioned in the optical path of the display optical system between the semi-transmittance surface and the framework. The target lens allows the diopter requirement of the display optical system to be satisfied with respect to the connected photographic lens.

The present invention is described as relating to a camera. However, the present invention is not intended to be limited to a camera. For example, the present invention can be used in devices including, but not limited to, camcorders, motion picture camera, telescopes, binoculars, microscopes, range finding equipment, lasers, fiber optic communication systems, various optical projection systems, CD mastering systems. Thus, the present invention can be used with virtually any type of optical device.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical device having an external lens connectable thereto and allowing an optical device user to view a subject through the external lens, the optical device comprising:

a viewing optical system allowing the user to view the subject through the external lens, the viewing optical system including an eye piece and an objective lens positioned between the eye piece and the external lens; and a display optical system including a framework which displays information, the display optical system allowing the user to view the information displayed on the framework through the eyepiece, wherein the respective positions of the eye piece, the objective lens and the framework are fixed and do not require changing to allow the optical device to be useable with external lenses having different, respectively corresponding angles of view.

2. An optical device as in claim 1, wherein:

the viewing optical system has an optical path extending through the external lens and the objective lens to the eye piece, and includes a semi-transmittance surface positioned in the optical path, and the display optical system has an optical path extending from the framework, through the semi-transmittance surface to the eye piece, and includes a target lens positioned in the optical path of the display optical system between the semi-transmittance surface and the framework, to allow the diopter requirement of the display optical system to be satisfied with respect to the connected external lens.

3. An optical device as in claim 1, wherein the objective lens has a negative refracting power and the eye piece has a positive refracting power.

4. An optical device as in claim 2, wherein the target lens has a positive refracting power with respect to an external lens with a narrow angle of view.

5. An optical device as in claim 1, wherein the same framework is useable with different external lenses connectable to the optical device.

6. An optical device as in claim 2, wherein the same framework is useable with different external lenses connectable to the optical device.

7. An optical device as in claim 1, further comprising a housing which holds the viewing optical system and the display optical system and does not require a change in shape for external lenses connected to the optical device and having different respectively corresponding angles of view.

8. An optical device as in claim 2, further comprising a housing which holds the viewing optical system and the display optical system and does not require a change in shape for external lenses connected to the optical device and having different respectively corresponding angles of view.

9. An optical device as in claim 1, wherein the optical device is a camera and the external lens is a photographic lens.

10. An optical device as in claim 2, wherein the optical device is a camera and the external lens is a photographic lens.

11. A camera having a photographic lens connectable thereto and allowing a photographer to view a subject through the photographic lens, the camera comprising:

a viewing optical system allowing the photographer to view the subject through the photographic lens, the viewing optical system including an eye piece and an objective lens positioned between the eye piece and the photographic lens; and a display optical system including a framework which displays information, the display optical system allowing the photographer to view the information displayed on the framework through the eyepiece, wherein the respective positions of the eye piece, the objective lens and the framework are fixed and do not require changing to allow the camera to be useable with different photographic lenses having different, respectively corresponding angles of view.

12. A camera as in claim 11, wherein:

the viewing optical system has an optical path extending through the photographic lens and the objective lens to the eye piece, and includes a semi-transmittance surface positioned in the optical path, and the display optical system has an optical path extending from the framework, through the semi-transmittance surface to the eye piece, and includes a target lens positioned in the optical path of the display optical system between the semi-transmittance surface and the framework, to allow the diopter requirement of the display optical system to be satisfied with respect to the connected photographic lens.

13. A camera as in claim 11, wherein the objective lens has a negative refracting power and the eye piece has a positive refracting power.

14. A camera as in claim 12, wherein the target lens has a positive refracting power with respect to a photographic lens with a narrow angle of view.

15. A camera as in claim 11, wherein the same framework is useable with different photographic lenses connectable to the camera.

16. A camera as in claim 12, wherein the same framework is useable with different photographic lenses connectable to the camera.

17. A camera as in claim 11, further comprising a housing which holds the viewing optical system and the display optical system and does not require a change in shape for photographic lenses connected to the camera and having different respectively corresponding angles of view.

18. A camera as in claim 12, further comprising a housing which holds the viewing optical system and the display optical system and does not require a change in shape for photographic lenses connected to the camera and having different respectively corresponding angles of view.

* * * * *